United States Patent

Thomas et al.

[11] Patent Number: 6,130,286
[45] Date of Patent: Oct. 10, 2000

[54] FAST DRYING CLEAR COAT COMPOSITION WITH LOW VOLATILE ORGANIC CONTENT

[75] Inventors: Stephen J. Thomas, Aspinwall; Charles M. Kania, Natrona Heights, both of Pa.

[73] Assignee: PPG Industries Ohio, Inc., Cleveland, Ohio

[21] Appl. No.: 09/215,483

[22] Filed: Dec. 18, 1998

[51] Int. Cl.[7] ............... C08J 3/00; C08K 3/20; C08L 75/00; C08L 41/00; C08L 43/00
[52] U.S. Cl. ............ 524/507; 524/502; 524/852; 524/853; 525/123; 525/328.8; 525/330.1; 525/455
[58] Field of Search ............ 525/123, 455, 525/328.8, 330.1; 524/507, 502, 852, 853

[56] References Cited

U.S. PATENT DOCUMENTS

| | | | |
|---|---|---|---|
| 3,549,583 | 12/1970 | Nagata et al. | 260/37 |
| 5,214,086 | 5/1993 | Mormile et al. | 524/237 |
| 5,279,862 | 1/1994 | Corcoran et al. | 427/407.1 |
| 5,314,953 | 5/1994 | Corcoran et al. | 525/123 |
| 5,331,050 | 7/1994 | Harper | 525/125 |
| 5,514,755 | 5/1996 | Fenn et al. | 525/329.5 |
| 5,741,880 | 4/1998 | Valepey, III et al. | 528/74 |
| 5,753,756 | 5/1998 | Aerts et al. | 525/111.5 |
| 5,834,555 | 11/1998 | Meisenburg et al. | 524/591 |

FOREIGN PATENT DOCUMENTS 0 866 082 A1  2/1998  European Pat. Off. .
2 452 500     3/1979  France .

*Primary Examiner*—Patrick D. Niland
*Attorney, Agent, or Firm*—Dennis G. Millman

[57] ABSTRACT

A fast-drying coating composition intended primarily as an automotive clear coat that may be cured at ambient conditions is provided with VOC less than 4.0 (preferably about 3.5) by the use as a major film-forming component an acrylic polyol that is the product of a combination of alkyl (meth)acrylate monomers and hydroxyalkyl (meth)acrylate monomers, at least one of which in a specific embodiment is the reaction product of a hydroxyalkyl (meth)acrylate and ε-caprolactone. The coating composition further includes a curing agent reactive with hydroxyl groups, particularly a polyisocyanate.

20 Claims, No Drawings

FAST DRYING CLEAR COAT COMPOSITION WITH LOW VOLATILE ORGANIC CONTENT

BACKGROUND OF THE INVENTION

This invention relates to a curable coating composition particularly adapted for use as a clear top coat for automobiles which has fast drying speed. More particularly, the type of coating involved is that which includes as the primary binder constituents an acrylic polyol and a curing agent, typically a polyisocyanate.

Automobiles are sometimes coated with a plurality of layers, typically a pigmented base coating composition onto which is subsequently applied a different top coating composition. The top coat is frequently referred to as "clear," that is, substantially without pigment, but minor amounts of pigments or other materials that affect the appearance of the automobile may be included. Acrylic polyol based top coats are particularly useful for their compatibility with a wide variety of base coating compositions.

An important factor in the productivity of an automobile painting operation is the speed with which the top coat dries to a condition that is no longer tacky. "Drying" in this context does not entail completing the curing reactions, but rather an initial surface hardening due primarily to solvent evaporation. Although acrylic polyol based coating compositions have a desirable combination of properties, it has been desired to shorten the dry time of this type of coating. It was known to increase drying speed by selecting monomers that increase the $T_g$ (glass transition temperature) of the acrylic polyol. In particular, increasing the methacrylate monomer content of the acrylic polyol was known as a way to increase $T_g$ (U.S. Pat. Nos. 5,279,862 and 5,314,953). Some attempts to further increase drying speed, especially under ambient conditions, have heretofore not been as successful as desired because increased drying speed has generally been accompanied by an undesirable degradation in the appearance of the final coating. A more successful approach to increasing cure speed while maintaining other important properties is the subject matter of commonly owned, co-pending U.S. patent application Ser. No. 09/086,919 filed May 29, 1998. It would be desirable to further improve upon the compositions disclosed in that application by reducing the volatile organic content.

Reducing the amounts of volatile organic solvents in automobile refinish coatings is challenging because the high appearance standards for automotive coatings are particularly difficult to achieve with coating compositions having reduced amounts of organic solvents. For use as an automotive refinish coating, there is the further requirement that the coating composition be capable of ambient temperature cure or, at most, a forced heating step with a slightly elevated temperature. Automotive refinish clear coatings have the additional requirement that the clear coating should not exhibit a significant amount of yellowing since this can detract from the appearance of the underlying pigmented coating.

U.S. Pat. Nos. 5,279,862 and 5,314,953 (Corcoran et al.) disclose fast drying auto refinish coating compositions that rely upon a high methacrylate monomer content in the acrylic polyol portion of the binder resin. Reducing organic volatiles is not an objective of these patents.

U.S. Pat. No. 5,514,755 (Fenn et al.) and U.S. Pat. No. 5,741,880 (Valpey et al.) are directed to reducing organic volatile content of auto refinish coatings. To attain higher solids content compositions, lower molecular weight polymers are the objective of these patent. In particular, the patents discloses the use of acrylic polyols made from monomers that include substantial portions of isobornyl methacrylate.

U.S. Pat. No. 5,753,756 (Aerts et al.) also deals with reducing the volatile content of auto refinish coatings, wherein the approach is to use a complex hydroxy functional oligoester in the binder resin. The use of caprolactones is mentioned as part of the synthesis of these oligoesters (column 4).

French Patent Publication No. 2 452 500 discloses generally the use of glycidyl compounds reacted with acrylic acid or methacrylic acid as a component of acrylic polyols.

Accordingly, there is a need for a fast drying automotive refinish clear coating composition which not only has excellent physical properties and appearance, but also meets increasingly stringent requirements for lower volatile organic content.

SUMMARY OF THE INVENTION

In accordance with the present invention there is provided a clear automotive refinish coating composition of the type containing as the primary resin components an acrylic polyol cured with a polyisocyanate compound. Advantageously, the coating composition of the present invention exhibits the combination of a volatile organic content not exceeding 4.0 pounds per gallon, preferably not exceeding 3.6 pounds per gallon, excellent appearance properties, and exceptionally fast drying times for a coating of this type. The acrylic polyol that is used is novel and is characterized by relatively low viscosity for this type of polymer.

The coating compositions of the present invention contain as the primary binder components 50 to 80 weight percent of an acrylic polyol (A) and 20 to 50 weight percent of a curing agent (B) reactive with hydroxyl groups, such as a polyisocyanate. The weight percentages above are based on the total resin solids weight of (A) plus (B). The improvement here lies in the acrylic polyol which is prepared from reactants comprising:

(i) 20 to 70 percent, preferably 25 to 60 percent, most preferably 30 to 55 percent hydroxy functional acrylate monomers;

(ii) 30 to 80 percent, preferably 40 to 75 percent, most preferably 45 to 65 percent unsaturated monomers without functional groups reactive with isocyanate; and (iii) 0 to 5 percent unsaturated acid monomer.

Hydroxy functional acrylate monomer component (i) above includes at least two different selected types (a) and (b), and optionally a third type (c), as follows:

(a) 0.5 to 15 percent, preferably 1 to 10 percent of a monomer that comprises an acrylate or methacrylate in which the esterifying group is the residue of a glycidyl group which is, in turn, bound to a terminal group that includes a branched alkyl group, preferably a tertiary alkyl group, as in structure (I) herein;

(b) 5 to 40 percent, preferably 10 to 35 percent, of a monomer that is an acrylate or methacrylate in which the esterifying group is a hydroxyl ester having one or more ester groups, as in structure (II) herein; and (c) 0 to 40 percent, preferably 5 to 35 percent, of one or more hydroxyalkyl acrylate or methacrylate monomers different from (a) or (b).

The percentages for the acrylic polyol constituents are based on total resin solids weight of all the monomers that constitute the acrylic polyol.

DETAILED DESCRIPTION

The coating composition of the present invention comprises two components that are maintained as separate packages until immediately prior to use. One component (A) contains acrylic polyol, and the other component (B) contains a curing agent reactive with the hydroxyl groups in the first component. Preferably, the curing agent includes a polyisocyanate, but may comprise other known curing agents reactive with hydroxyl groups such as melamine-formaldehyde compounds and anhydrides. The reaction product of components (A) and (B) comprises the primary film-forming portion of the coating composition. Optimized commercial embodiments of the coating composition may optionally include additional ingredients such as diluents (e.g., solvents and/or reactive resinous diluents), catalysts, ultraviolet light absorbers or stabilizers, and pigments as are conventional in the art. These additional ingredients may be included in either or both components. These coating compositions are particularly useful for automotive finishes, especially as clear top coats over a pigmented base coat, and can be applied over a variety of base coats. In a particular commercial application of the present invention, the coating composition is intended for use in refinishing automobiles, wherein drying of the film-forming polymer is effected at or near ambient temperatures.

The acrylic polyol is made by addition polymerization of at least two types of unsaturated monomers: (i) acrylate monomers having hydroxyl groups and (ii) unsaturated monomers without functional groups reactive with isocyanate. Optionally, the monomers from which the acrylic polyol is made may additionally include monomer type (iii) comprised of one or more unsaturated carboxylic acid. Based on resin solids weight of the total monomer combination used to make the acrylic polyol (A), the hydroxyl monomers (i) are included in amounts of 20 to 70 percent, preferably 25 to 60 percent, most preferably 30 to 55 percent. The non-functional monomers (ii) are included in amounts of 30 to 80 percent, preferably 40 to 75 percent, most preferably 45 to 65 percent. The acid monomers (iii) may be included in amounts of 0 to 5 percent, preferably 0.1 to 2 percent.

The unsaturated hydroxy functional monomers (i) from which the acrylic polyol is made comprise a combination of: 0.5 to 15 percent, preferably 1 to 10 percent of a monomer (a) to be described below; 5 to 40 percent, preferably 10 to 35 percent, of a monomer (b) to be described below; and 0 to 40 percent, preferably 5 to 35 percent, of one or more other unsaturated monomers (c) to be described below. having hydroxyl groups, preferably hydroxyalkyl acrylates, wherein the percentages are based on total resin solids weight of the monomer mixture used to make the acrylic polyol. Monomers (a), (b), and (c) will be described in the following paragraphs.

Monomer (a) is a compound of structure (I) as follows:

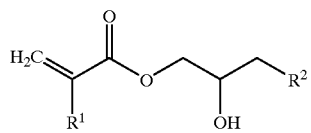

(I)

where $R^1$=H or $CH_3$,

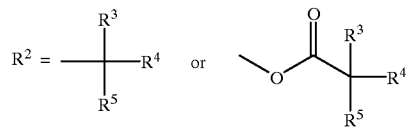

$R^3$ is H or an alkyl group,
$R^4$ is an alkyl group, and
$R^5$ is an alkyl group containing at least four carbon atoms.

The monomer (a), i.e., the compound of structure (I), comprises an acrylate or methacrylate in which the esterifying group is the residue of a glycidyl group which is, in turn, bound to a terminal group that includes a branched alkyl group, preferably a tertiary alkyl group. At least one of the alkyl branches in the terminal group may include a chain four or more carbon atoms in length. Preferably the branched alkyl group includes at least eight carbon atoms. A branched alkyl structure in the terminal group is believed to be particularly advantageous for attaining optimal results with the present invention. Surprisingly, the substantial chain length of monomer (a) and its inclusion of alkyl groups of substantial length permit the acrylic polyols into which it is polymerized to have very rapid drying rates without a substantial loss of hardness in the final coating that might otherwise be expected of such a structure. Good gloss and flow properties are also attained with the preferred embodiments.

Monomer (a) may be synthesized by reacting acrylic or methacrylic acid with a monoepoxide having substantial hydrocarbon chain length, such as commercially available epoxidized alpha olefins of the formula:

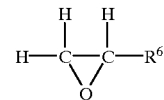

where $R^6$ includes a branched alkyl group having at least 6 carbon atoms, preferably at least 8 carbon atoms. Polyepoxides such as certain of the commercially available family of EPON products may be used if partially defunctionalized to form monoepoxides. Epoxies with little or no aromatic content are preferred for automotive coatings. Preferably, the terminal group in the esterifying group of monomer (a) itself includes an ester group, in which case the monomer may be the reaction product of acrylic acid or methacrylic acid and CARDURA E (a glycidyl ester of Versatic acid sold by Shell Chemical Company). Versatic acid is a proprietary, synthetic blend of isomers of saturated tertiary alkyl monoacid having nine to eleven carbon atoms. The (meth) acrylic and CARDURA E reaction yields the following structure:

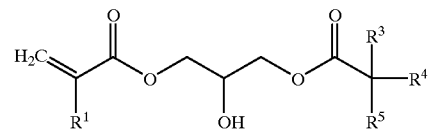

where the groups are as defined above. Alternatively, monomer (a) with an ester-containing terminal group may be produced from the reaction of glycidyl acrylate or glycidyl methacrylate with a long chain organic acid such as Versatic acid, neodecanoic acid, or isostearic acid. The branched structures of the preferred acids are believed to be advantageous. The use of monomer (a) in automobile refinish coating compositions is the subject matter of commonly owned U.S. patent application Ser. No. 09/086,919 filed on May 29, 1998.

Monomer (b) is a compound having structure (II):

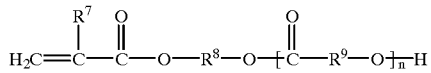

where $R^7$ is H or $CH_3$.

$R^8$ is an alkylene group having 2 to 6 carbon atoms.

$R^9$ is an alkylene group typically having 5 carbon atoms.

n is 1 to 20, usually 1 to 5, preferably 1 to 2.

Monomer (b) may be characterized as an acrylate or methacrylate in which the esterifying group is itself an ester having one or more ester groups and a hydroxyl group. Commercially available monomers of this type are typically produced from the reaction of hydroxyalkyl (meth)acrylates with lactones. The choice of the particular (meth)acrylate determines $R^8$ in the structure (II), wherein the hydroxyalkyl group contains at least two carbon atoms. Substantially larger numbers of carbon atoms are possible in the hydroxyalkyl group, but acrylates having more than six carbon groups in the hydroxyalkyl group are not readily available commercially. For the lactone used to make the hydroxy (poly)ester acrylate, ε-caprolactone is highly preferred for its desirable ring-opening characteristics. Thus, $R^9$ in structure (II) is typically $C_5$. Examples of commercial monomers of this type are reaction products of hydroxyethyl methacrylate with ε-caprolactone, and are sold under the name TONE by Union Carbide and Chemicals Company and under the name PLACCEL by Daicel Chemical Industries. These products contain the reaction products of one mole of hydroxyethyl methacrylate with one to five moles of ε-caprolactone, but substantially larger amounts of ε-caprolactone may be used to produce longer polyester chains. The 1:1 molar ratio product is preferred in the present invention for the sake of its minimized OH equivalent weight, but other ratios may be used, particularly if sufficient OH functionality is provided in the other monomers from which the acrylic polyol is made.

Monomer (c) comprises other hydroxy group-containing unsaturated monomers that are included to provide the desired total hydroxy functionality to the acrylic polyol beyond that provided by monomers (a) and (b), if needed. Monomer (c) is generally selected to be less costly than monomers (a) and (b) and may include one or more compounds. Examples of suitable hydroxy-containing unsaturated monomers (c) are vinyl monomers such as hydroxyalkyl acrylates and methacrylates, including the acrylic acid and methacrylic acid esters of ethylene glycol and propylene glycol. Typically, these acrylates and methacrylates have 2 to 6 carbon atoms in the alkyl group. Also useful are hydroxy-containing esters and/or amides of unsaturated acids such as maleic acid, fumaric acid, itaconic acid and the like. Most commonly, monomer (c) comprises hydroxyalkyl acrylates and hydroxyalkyl methacrylates, for example hydroxyethyl acrylate, hydroxyethyl methacrylate, 1-hydroxybutyl acrylate or methacrylate, and 2-hydroxybutyl acrylate or methacrylate. An acrylate with a secondary hydroxy group, such as hydroxypropyl methacrylate, is particularly advantageous.

Monomer group (ii) included in the polymerization of the acrylic polyol of the present invention includes other unsaturated copolymerizable materials selected from a wide range of compounds. Preferably, the major portion consists of vinyl monomers, more specifically acrylates. Typical acrylates may include alkyl, cycloalkyl, or aryl acrylates and methacrylates having 2 to 6 carbon atoms in the esterifying group. Examples of particularly useful acrylate monomers are butyl methacrylate, methyl methacrylate, and n-butyl methacrylate. Other monomers that may be considered useful include lauryl methacrylate, 2-ethylhexyl methacrylate, isobornyl methacrylate, and cyclohexyl methacrylate. Another type of vinyl monomer that may be included are the aromatic vinyl compounds such as styrene. Other copolymerizable monomers which optionally may be included in the monomer group (ii) are ethylenically unsaturated materials such as monoolefinic and diolefinic hydrocarbons, unsaturated esters of organic and inorganic acids, amides and esters of unsaturated acids, nitriles, and unsaturated acids. Examples of such monomers include 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate. Because the acrylic polyol of the present invention is intended to have relatively low molecular weight for the sake of reduced viscosity, the particular species chosen for the monomer group (ii) preferably include a substantial quantity of one or more monomers that have the characteristic of raising the glass transition temperature ($T_g$) of the acrylic polyol. Monomers that may serve this purpose include substituted and unsubstituted isobornyl (meth) acrylate, trimethylcyclohexyl methacrylate, t-butyl methacrylate, and cyclohexyl methacrylate. Isobornyl methacrylate is particularly preferred for this purpose, and in preferred embodiments, it constitutes at least 20 weight percent of the total monomer content. It should be understood that monomer group (ii) may include mixtures.

It has been found useful in some cases to include a third category of monomers (iii) to make the acrylic polyol. These are acid functional monomers, a small amount of which extends the pot life of the coating composition. Virtually any unsaturated acid functional monomer may serve this purpose, for example, acrylic acid, methacrylic acid, itaconic acid, and half esters of unsaturated dicarboxylic acids such as maleic acid. Inclusion of these monomers is optional, since increasing pot life may not be needed in all cases. When included, the amount of monomer (iii) is preferably limited so as to not interfere with the intended crosslinking reaction between components (A) and (B). Thus, monomer (iii) typically constitutes no more than 5, preferably no more than 2, weight percent resin solids of the total monomer combination comprising the acrylic polyol. For an appreciable effect in those embodiments that include it, monomer (iii) is used in amounts of at least 0.1 weight percent.

The acrylic polyol used in formulating preferred embodiments of automotive refinish coating compositions generally have a hydroxyl number ranging from about 40 to about 110, preferably from about 60 to about 95, and more preferably from about 65 to about 80 mg KOH/gram of polymer determined by potentiometric techniques. The acrylic polyols generally have a number average molecular weight ranging from 500 to 4000, preferably from 1000 to 2500, the molecular weight determined by gel permeation chromatography (GPC) using polystyrene as standard.

In the practice of preferred embodiments of the invention, the curing agent of component (B) comprises a polyisocyanate curing agent which is capable of reacting with the active hydrogens in the acrylic polyol to give a thermosetting coating. A combination of two or more polyisocyanates is sometimes found to be useful.

Examples of polyisocyanates that may be used in component (B) are aliphatic, cycloaliphatic, and aromatic polyisocyanates, including mixtures thereof. Typically, the polyisocyanate is a diisocyanate, preferably an aliphatic isocyanate. Examples of suitable aliphatic diisocyanates include 1,4-tetramethylene diisocyanate and 1,6-hexamethylene diisocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable cycloaliphatic diisocyanates include 1,4-cyclohexyl diisocyanate, isophorone diisocyanate, 4,4'-methylene-bis-(cyclohexyl isocyanate). Triisocyanates such as TMXDI-TMP aliphatic triisocyanate available from Cytec Industries, Inc., can also be used. Isocyanurates and biurets of the diisocyanates described above can also be used. Preferably, the polyisocyanate materials included in the curing agent (B) of the present invention are selected from those that yield relatively great molecular weight increase to compensate for the relatively low molecular weight of the acrylic polyol component (A). For this reason, curing agent (B) preferably comprises a major portion of the isocyanurate of hexamethylene diisocyanate.

The amounts of acrylic polyol and polyisocyanate curing agent which are used in the practice of the invention are preferably adjusted so that the equivalent ratio of isocyanate groups to hydroxyl groups is within the range of 0.8:1 to 1.5:1, preferably slightly greater than 1:1. Isocyanate to hydroxyl equivalent ratios greater than this ratio are not preferred because hardness and durability of the resultant coating may suffer; whereas ratios lower than this ratio are not preferred because flexibility of the resultant coating may suffer.

In addition to the film-forming components, other adjuvant resins such as polyesters can also be added to the formulation of the composition of the present invention. Usually, these polyesters are polyester polyols which are designed to be cured with a polyisocyanate. The polyesters are formed by the polyesterification of an organic polycarboxylic acid or its functional equivalent thereof with an organic polyol. Among the acids which can be used are phthalic acid, terephthalic acid, tetrahydrophthalic acid, hexa-hydrophthalic acid, azeleic acid and dimerized fatty acid including mixtures. Examples of suitable polyols are ethylene glycol, 1,4-butanediol, neopentyl glycol, trimethylpentanediol and trimethylolpropane including mixtures. Also, polycaprolactone-type polyesters may be employed which are formed from reaction of a cyclic lactone such a epsilon-caprolactone with a polyol or a hydroxy acid such as ethylene glycol and dimethylolpropionic acid.

Also present in preferred embodiments of the compositions intended for automotive coatings are constituents to resist the affect of solar ultraviolet radiation. These include ultraviolet light stabilizers and ultraviolet light absorbers, and preferably both are included. When they are included, effective amounts of ultraviolet light stabilizers and absorbers are each typically in the range of 0.01 to 5.0 percent by weight, preferably 1.5 to 2.5 percent by weight, the percentages based on the total weight of solids of the curing composition. A variety of ultraviolet light stabilizers well known to those skilled in the art can be used. Especially useful are the UV stabilizers and absorbers commercially available under the name TINUVIN® from Ciba-Geigy Company.

When formulated as automotive refinish coatings, the compositions of the present application include organic liquid diluent, typically in an amount of between 25 to 40 percent by weight of the total composition. Additional liquid diluent is commonly added at the point of use in the form of a viscosity reducer in accordance with the particular equipment and conditions at the paint shop, which may further increase the total solvent content. By liquid diluent is meant a volatile solvent or non-solvent which is removed after the coating is applied and which reduces viscosity sufficiently to permit control of coating thickness, flow, uniformity, and appearance in whatever coating application technique (viz., spraying) is used. Also, diluents assist in substrate wetting, resinous component compatibility, package stability, and coalescence or film formation. Suitable solvents include aliphatic solvents such as VM & P naphtha; aromatic petroleum distillates such as toluene and xylene; cycloaliphatic solvents like cyclohexane; ketones like methyl ethyl ketone, methyl isobutyl ketone and methyl amyl ketone; alcohols such as ethyl alcohol, propyl alcohol and diacetone alcohol; acetates like butyl acetate and hexyl acetate; and mono and dialkyl ethers of ethylene, propylene and diethylene glycol such as ethylene glycol monoethyl ether, ethylene glycol monobutyl ether, ethylene glycol monoethyl ether acetate, diethylene glycol diethyl ether, propylene glycol monomethyl ether, dipropylene glycol ether, and propylene glycol monomethyl ether acetate. Pentanedione may optionally be included as a solvent and pot life extender.

Metal catalysts are used in the coating compositions of present invention for facilitating the cure of compositions containing hydroxyl and isocyanate groups. Preferably, the metal catalysts are formed from tin, cobalt, calcium and cesium, preferably from tin. Such metal catalysts are known in the art for accelerating the reaction of hydroxyl-containing organic molecules with isocyanates to form urethane groups. Representative of such catalysts are metal salts of carboxylic acids, diorganometallic oxides, mono- and diorganometallic carboxylates, and the like. Specific examples of such metal catalysts are calcium naphthanate, cesium naphthanate, cobalt naphthanate, dibutyl tin dilaurate, dibutyl tin diacetate, dibutyl tin octoate and dibutyl tin naphthanate. Such catalysts are used in curing polyisocyanate-polyol compositions in an amount selected to provide the particular performance level desired, and may range from 0 to 0.10 percent by weight of the solids content of such compositions. In preferred commercial embodiments, the amount of metal catalyst of the type disclosed above is typically in the range of 0.05 to 5.0 percent, the percentages based on the total weight of the solids of the curing compositions.

The film-forming compositions of the present invention are particularly adapted to be formulated into clear coating compositions. However, they could be formulated with pigments to form pigmented coating compositions. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake or pearlescent pigments. The pigment content of the paint is usually expressed as the pigment-to-resin weight ratio. In the practice of the invention, when the film-forming coating compositions of the present invention contain a pigment, the pigment-to-resin weight ratios may be as high as 2:1 and for most pigmented coatings are within the range of 0.05 to 1:1.

The packages containing the components of the coating composition are typically combined together with mild agitation prior to application. The coating compositions are typically applied by spray application although other well known modes of application can be utilized. As mentioned above, the coating composition is typically applied as a clear topcoat over a pigmented base coat, including a variety of conventionally known base coats. The clear topcoat is applied at a generally uniform film thickness, which may typically be in the range of about 2 to about 4 mils dry film thickness. The coating compositions can be cured at ambient temperatures. Alternatively, even greater speed may be attained by using slightly elevated temperatures, e.g., temperatures ranging from 30° C. to 60° C.

The coating compositions of the present invention dry rapidly, with dust-free times of 15 to 20 minutes or less being attainable. Determination of dust-free time is described in the examples. Tack-free times (determined by thumb pressure) of some embodiments are on the order of 60 minutes to 75 minutes. The final films are smooth, flexible, hard, and durable. The coating compositions are particularly useful for application over a variety of aqueous and non-aqueous pigmented base coats, both thermoplastic and thermosetting. Because of their fast drying rate, they are especially useful in automotive refinish applications.

The invention is further illustrated by the specific embodiments set forth in the examples. Examples 1 through 6 present a comparison of the invention with a composition disclosed in U.S. Pat. No. 5,514,755. Examples 1 and 2 are acrylic polyols of the type disclosed in that patent, while Examples 3–6 are embodiments of the present invention. Examples A, B, C, and D are isocyanate-cured, two component coating compositions that include the acrylic polyols of Examples 1, 2, 3, and 4, respectively. Test results of these coatings examples are reported in Table 1. All compositional values in the examples are in parts by weight unless indicated otherwise.

| Monomer | Example 1 | Example 2 | Example 3 | Example 4 | Example 5 | Example 6 |
|---|---|---|---|---|---|---|
| Hydroxypropyl methacrylate | 13 | 30 | 13 | 21.2 | 24 | 22 |
| Isobornyl methacrylate | 25 | 25 | 25 | 25 | 25 | 25 |
| Butyl methacrylate | 12 | 9.1 | 6 | 12 | 5 | 6 |
| Styrene | 27 | 22.2 | 21.2 | 21 | 23 | 21 |
| Cardura E/acrylic acid adduct | 5 | 5 | 5 | 5 | 5 | 5 |
| Acrylic acid | 1 | 1 | 1 | 1 | 1 | 1 |
| 4-Hydroxybutyl acrylate | 17 | 7.7 | — | — | — | — |
| TONE M-201* | — | — | 28.8 | 14.8 | 17 | 20 |

*TONE M-201 is the reaction product of one mole of hydroxyethyl methacrylate and one mole of caprolactone commercially available from Union Carbide. An equivalent product is available under the name PLACCEL FM-1 from Daicel Chemical Industries (Japan).

The polymerization procedure was the same for each of the examples. Xylene was added to a pressure reactor and heated to 155° C. The monomers, along with an initiator, di-tertiaryamyl peroxide in additional xylene, were added to the vessel over a period of three hours. Following the reaction, the feed lines were rinsed with xylene, an additional charge of initiator was fed into the vessel, and then a final rinse of xylene. Solids content was adjusted to a target value of 67.5 percent by adding methyl amyl ketone. The polymer products were formulated into coatings compositions in the following Examples A through D.

EXAMPLE A

Comparative Coating Composition

| Component A | Formula Weight | Solid Resin |
|---|---|---|
| Acrylic polyol of Example 1 | 100.26 | 66.69 |
| TINUVIN 384[1] | 1.22 | 1.16 |
| BYK 306[2] | 1.74 | 0.21 |
| TINUVIN 292[3] | 0.57 | 0.57 |
| Dibutyl tin dilaurate | 0.08 | 0.08 |
| Methyl amyl ketone | 10.00 | |
| Methyl isobutyl ketone | 8.67 | |
| Component B | | |
| HDT-LV polyisocyanate[4] | 31.29 | 31.29 |
| Reducer | | |
| DT-870 solvent blend[5] | 15.88 | |
| Pentanedione[6] | 5.29 | |

| % Wt Solid | VOC | Equivalents Ratio NCO/OH |
|---|---|---|
| 57.14 | 3.50 | 1.18 |

[1]Ultraviolet absorber available from Ciba-Geigy Corp.
[2]Silicone wetting agent and flow control additive from Byk Chemie USA..
[3]Hindered amine light stabilizer bis(1,2,2,6,6-pentamethyl-4-piperidinyl) sebacate from Ciba-Geigy Corp.
[4]Isocyanurate of hexamethylene diisocyanate in methyl ethyl ketone commercially available form Rhone Poulenc.
[5]Organic solvent blend available from PPG Industries, Inc.
[6]Solvent and pot life extender available from Union Carbide Chemicals Plastics Corporation.

EXAMPLE B

Comparative Coating Composition

| Component A | Formula Weight | Solid Resin |
|---|---|---|
| Acrylic polyol of Example 2 | 92.70 | 61.62 |
| TINUVIN 384[1] | 1.22 | 1.16 |
| BYK 306[2] | 1.74 | 0.21 |
| TINUVIN 292[3] | 0.57 | 0.57 |
| Dibutyl tin dilaurate | 0.08 | 0.08 |
| Methyl amyl ketone | 10.00 | |
| Methyl isobutyl ketone | 11.17 | |

-continued

| Component B | | |
|---|---|---|
| HDT-LV polyisocyanate[4] Reducer | 36.36 | 36.36 |
| DT-870 solvent blend[5] | 15.88 | |
| Pentanedione[6] | 5.29 | |

| % Wt Solid | VOC | Equivalents Ratio NCO/OH |
|---|---|---|
| 57.14 | 3.51 | 1.18 |

EXAMPLE C

Coating Composition of the Invention

| Component A | Formula Weight | Solid Resin |
|---|---|---|
| Acrylic polyol of Example 3 | 102.60 | 66.69 |
| TINUVIN 384[1] | 1.22 | 1.16 |
| BYK 306[2] | 1.74 | 0.21 |
| TINUVIN 292[3] | 0.57 | 0.57 |
| Dibutyl tin dilaurate | 0.08 | 0.08 |
| Methyl amyl ketone | 10.00 | |
| Methyl isobutyl ketone | 6.33 | |
| Component B | | |
| HDT-LV polyisocyanate[4] Reducer | 31.29 | 31.29 |
| DT-870 solvent blend[5] | 15.88 | |
| Pentanedione[6] | 5.29 | |

| % Wt Solid | VOC | Equivalents Ratio NCO/OH |
|---|---|---|
| 57.14 | 3.53 | 1.18 |

EXAMPLE D

Coating Composition of the Invention

| Component A | Formula Weight | Solid Resin |
|---|---|---|
| Acrylic polyol of Example 4 | 103.78 | 66.69 |
| TINUVIN 384[1] | 1.22 | 1.16 |
| BYK 306[2] | 1.74 | 0.21 |
| TINUVIN 292[3] | 0.57 | 0.57 |
| Dibutyl tin dilaurate | 0.08 | 0.08 |
| Methyl amyl ketone | 10.00 | |
| Methyl isobutyl ketone | 5.14 | |
| Component B | | |
| HDT-LV polyisocyanate[4] Reducer | 31.29 | 31.29 |
| DT-870 solvent blend[5] | 15.88 | |
| Pentanedione[6] | 5.29 | |

| % Wt Solid | VOC | Equivalents Ratio NCO/OH |
|---|---|---|
| 57.15 | 3.52 | 1.18 |

The viscosities of each of the coating compositions of Examples A through D was tested by means of a Brookfield LVT viscometer at three different times: immediately after mixing the components, one hour after mixing, and two hours after mixing. Additionally, the time after mixing required for each composition to form a gel was observed by placing a quantity of the blended components into a two ounce jar and recording the time at which no flow was observed then the jar was inverted. These data are reported in Table I, and demonstrate the capability of the embodiments of the present invention to achieve lower viscosities relative to the comparative examples at essentially the same VOC levels.

TABLE I

| | Viscosity (cPs) | | | Gel |
|---|---|---|---|---|
| | Initial | 1 Hr. | 2 Hrs. | Time (hrs.) |
| Example A | 84.0 | 188.5 | 364.5 | 3.0 |
| Example B | 65.0 | 89.5 | 148.0 | 5.5 |
| Example C | 59.0 | 97.0 | 183.0 | 4.0 |
| Example D | 57.5 | 80.0 | 105.0 | 6.0 |

Each of the coating formulations of Examples A through D was tested for performance by application onto a substrate prepared as follows. The substrates were 32 gauge steel panels phosphate treated and precoated with electrocoat and primer (available from Advanced Coating Technologies, Inc., Hillsdale, Mich.; as APR2471 1), scuffed with 600 grit sandpaper (P400-213Q, Imperial Wetordry production paper, "A" weight, available from 3M, St. Paul, Minn.), wiped clean with DX 330 degreaser (available from PPG Industries, Inc., Pittsburgh, Pa.), and sealed with DP40/DP401/DT870 (a sealer made by mixing 1 volume DP40 epoxy primer with 1 volume DP401 epoxy primer catalyst with ½ volume DT870 reducer, all available from PPG Industries, Inc.). The sealed substrates were air-dried under ambient conditions for at least 1 hour before the example coatings were applied. Over the base coat on each panel was then applied one of the clear coat compositions of Examples A through D. The coatings were applied with a Binks #62 spray gun at 50 pounds per square inch, at 68° F. (20° C.) and 62 percent relative humidity.

Coating compositions A through D exhibited commercially acceptable drying times, gloss, hardness, solvent resistance, and adhesion. Adhesion following humidity exposure was less than desired for compositions C and D, but use of the acrylic polyols of preferred Examples 5 and 6 would be expected to enhance adhesion after humidity.

The invention has been described with reference to particular embodiments for the sake of disclosing the best mode of the invention, but it should be understood that other variations and modifications as would be known to those of skill in the art may be resorted to without departing from the scope of the invention as defined by the claims.

What is claimed is:

1. A non-aqueous coating composition comprising:
   (A) 50 to 80 weight percent, based on total resin solids of (A) and (B), of an acrylic polyol comprising the polymerization product of:
      (i) 20 to 70 percent hydroxy functional acrylate monomers comprising:
         (a) 0.5 to 15 percent of acrylate or methacrylate in which the esterifying group is the residue of a glycidyl group and includes a branched alkyl group;

(b) 5 to 40 percent of acrylate or methacrylate in which the esterifyinig group is a hydroxy ester having one or more ester groups; and (c) 0 to 40 percent of one or more hydroxyalkyl acrylate or hydroxyalkyl methacrylate monomers different from (a) or (b);

(ii) 30 to 80 percent acrylate monomers without functional groups reactive with isocyanate; and (iii) 0 to 5 percent unsaturated acid monomer;

wherein the percentages of each of the acrylic polyol constituents is based upon total resin solids weight of all the acrylic polyol constituents;

(B) 20 to 50 weight percent, based on total resin solids of (A) and (B), of a curing agent reactive with hydroxyl groups;

the percentages based on weight of total resin solids of the composition; and (C) diluent consisting essentially of organic liquid;

wherein the volatile organic content of the coating composition is less than 4.0 pounds per gallon in a non-aqueous composition.

2. The coating composition of claim 1 wherein the acrylic polyol (A) comprises the polymerization product of:

25 to 60 percent of the monomer component (i);

1 to 10 percent of the monomer component (a);

10 to 35 percent of the monomer component (b);

5 to 35 percent of the monomer component (c);

40 to 75 percent of the monomer component (ii); and 0 to 5 percent of the monomer component (iii);

the percentages based upon total resin solids weight of all the acrylic polyol constituents.

3. The coating composition of claim 1 wherein:

monomer component (i) is employed in an amount of 30 to 55 percent;

monomer component (ii) is employed in an amount of 45 to 65 percent; and monomer component (iii) is employed in an amount of 0.1 to 2 percent;

the percentages based upon total resin solids weight of all the acrylic polyol constituents.

4. The composition of claim 1 wherein monomer component (b) comprises a compound of the following structure:

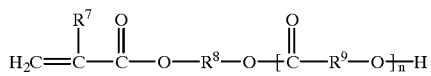

where $R^7$ is H or $CH_3$, $R^8$ is an alkylene group having 2 to 6 carbon atoms;

$R^9$ is an alkylene group having 5 carbon atoms; and n is 1 to 20.

5. The coating composition of claim 4 wherein the monomer component (a) comprises an acrylate or methacrylate having the structure:

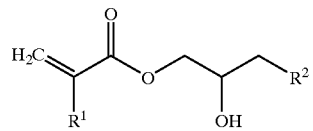

where $R^1$=H or $CH_3$,

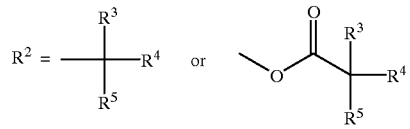

$R^3$ is H or an alkyl group, $R^4$ is an alkyl group, and $R^5$ is an alkyl group containing at least four carbon atoms.

6. The composition of claim 5 wherein $R^3$, $R^4$, and $R^5$ contain a total of at least 8 carbon atoms.

7. The composition of claim 1 wherein curing agent (B) comprises at least one polyisocyanate.

8. The composition of claim 1 wherein the acrylic polyol (A) is separate from the curing agent (B).

9. The composition of claim 1 wherein monomer component (iii) comprises isobornyl acrylate or methacrylate.

10. The composition of claim 9 wherein monomer component (iii) further comprises a vinyl aromatic compound and an acrylate or methacrylate different from isobornyl methacrylate.

11. The coating composition of claim 7 wherein the major polyisocyanate component of curing agent (B) is an isocyanurate of hexamethylene diisocyanate.

12. The coating composition of claim 1 wherein said coating composition is a clear coat composition.

13. The coating composition of claim 1 wherein said coating composition contains a pigment.

14. The coating composition of claim 1 further including a metal-containing catalyst, organic diluent, an ultraviolet light stabilizer, and an ultraviolet light absorber.

15. The coating composition of claim 1 wherein the volatile organic content of the coating composition is less than 3.6 pounds per gallon.

16. The coating composition of claim 1 wherein the curable film-forming components consist essentially of (A) and (B).

17. The composition of claim 4 wherein n is 1 to 5.

18. The coating composition of claim 4 wherein n is 1.

19. The composition of claim 17 wherein monomer component (b) comprises the reaction product of a hydroxyalkyl acrylate or methacrylate and ε-caprolactone.

20. The coating composition of claim 18 wherein monomer component (b) comprises the reaction product of hydroxyethyl methacrylate and ε-caprolactone.

* * * * *